(12) United States Patent
Geng et al.

(10) Patent No.: US 11,643,547 B2
(45) Date of Patent: *May 9, 2023

(54) HIGH STIFF THERMOPLASTIC COMPOSITIONS FOR THIN-WALL STRUCTURES

(71) Applicant: SHPP GLOBAL TECHNOLOGIES B.V., Bergen op Zoom (NL)

(72) Inventors: Eddie Kebin Geng, Exton, PA (US); Adam Starry, Exton, PA (US); Edward Kung, Selkirk, NY (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/440,390

(22) PCT Filed: Mar. 20, 2020

(86) PCT No.: PCT/IB2020/052628
§ 371 (c)(1),
(2) Date: Sep. 17, 2021

(87) PCT Pub. No.: WO2020/188539
PCT Pub. Date: Sep. 24, 2020

(65) Prior Publication Data
US 2022/0089860 A1    Mar. 24, 2022

(30) Foreign Application Priority Data

Mar. 21, 2019  (EP) .................... 19164387

(51) Int. Cl.
*C08L 67/02*  (2006.01)
(52) U.S. Cl.
CPC .......... *C08L 67/02* (2013.01); *C08L 2205/03* (2013.01)
(58) Field of Classification Search
None
See application file for complete search history.

(56) References Cited

U.S. PATENT DOCUMENTS

| 6,020,414 | A | 2/2000 | Nelsen et al. |
| 6,130,279 | A * | 10/2000 | Suzuki .................... C08K 3/22 435/809 |
| 6,204,414 | B1 | 3/2001 | Pfander et al. |
| 7,786,246 | B2 * | 8/2010 | Jansen .................... C08L 69/00 528/196 |
| 9,284,449 | B2 | 3/2016 | Sun et al. |
| 2012/0076573 | A1 * | 3/2012 | Pilliod ................ B29C 45/0005 403/265 |
| 2012/0214961 | A1 | 8/2012 | Bell et al. |
| 2013/0034740 | A1 | 2/2013 | Giachino et al. |
| 2014/0248483 | A1 * | 9/2014 | Evans .................... C08L 53/00 428/220 |
| 2015/0368458 | A1 * | 12/2015 | Sun .......................... C08K 7/14 523/400 |
| 2016/0324025 | A1 | 11/2016 | Bustle et al. |

FOREIGN PATENT DOCUMENTS

| CN | 102317373 A | 1/2012 |
| CN | 109957233 A | 7/2019 |
| EP | 3864087 A1 | 8/2021 |
| KR | 10-2017-0023094 A | 3/2017 |
| WO | 2019/199970 A1 | 10/2019 |

OTHER PUBLICATIONS

International Search Report dated Jul. 6, 2020 in PCT/IB2020/052628 (3 pgs.).
Written Opinion dated Jul. 6, 2020 in PCT/IB2020/052628 (5 pgs.).

* cited by examiner

*Primary Examiner* — Robert T Butcher
(74) *Attorney, Agent, or Firm* — Quicker Law, LLC

(57) ABSTRACT

A thermoplastic composition includes: from about 29 wt % to about 49 wt % of a thermoplastic polymer component including a first thermoplastic polymer consisting of polybutylene terephthalate and a second thermoplastic polymer consisting of polycarbonate, polyethylene terephthalate, copolymers thereof, or a combination thereof; from about 1 wt % to about 30 wt % of a component comprising a polyester elastomer, an ethylene/alkyl acrylate/glycidyl methacrylate terpolymer compatibilizer, or a combination thereof; and from about 50 wt % to about 70 wt % of a ceramic fiber component including ceramic fibers. The first thermoplastic polymer is present the composition in a ratio of at least 2:1 as compared to the second thermoplastic polymer. Articles including the thermoplastic composition are also described.

15 Claims, 3 Drawing Sheets

HIGH STIFF THERMOPLASTIC COMPOSITIONS FOR THIN-WALL STRUCTURES

CROSS-REFERENCE TO RELATED APPLICATION

This application is the National Stage of International Application No. PCT/IB2020/052628 filed Mar. 20, 2020, which claims priority to and the benefit of European Application No. 19164387.3 filed Mar. 21, 2019, the disclosures of which are incorporated herein by this reference in their entireties.

FIELD OF THE DISCLOSURE

The present disclosure relates to thermoplastic compositions including a ceramic fiber component, and more particularly to thermoplastic compositions including a ceramic fiber component, a polybutylene terephthalate component, and a thermoplastic polymer component including polycarbonate and/or polyethylene terephthalate.

BACKGROUND

Many consumer-oriented industries, e.g., the consumer electronics industry, have a need for blended thermoplastic compositions that provide very high stiffness with balanced ductility and impact resistance, are colorable from white to black, chemically resistant to everyday chemicals, possess excellent flow for thin wall processing, and transparency to wireless signals. Blends including polycarbonate (PC) and polybutylene terephthalate (PBT) with glass fibers can meet the above requirements to some extent, as described in U.S. Pat. No. 9,284,449. Compositions including high flow crystalline resins such as polyether ether ketone polymers (PEEK) or specialty nylon with glass fibers have also been used. Materials containing PEEK desirably have low dielectric interference to wireless signals, but the glass fibers in these compositions have a low stiffness, relatively poor dimensional stability and thus limit the stiffness of compositions incorporating them. In addition, parts including glass fibers—and in particular thin-wall molded parts—generally have higher warpage. Glass fibers are thus not typically used in applications requiring mechanically demanding parts. Fillers with a higher stiffness, such as carbon fibers, have the potential to improve the stiffness of thermoplastic compounds incorporating them, but they interfere with radio/wireless transmissions. In addition, conventional carbon fibers are not colorable.

These and other shortcomings are addressed by aspects of the present disclosure.

SUMMARY

Aspects of the present disclosure address the stiffness limitations of glass fiber-filled thermoplastic compounds in mechanically demanding consumer electronics parts applications, and provide a solution that exhibits a combination of one or more of the properties of high stiffness, high tensile elongation at break, good impact resistance, good colorability, and excellent chemical resistance.

Particular aspects of the disclosure relate to thermoplastic compositions including: (a) from about 29 wt % to about 49 wt % of a thermoplastic polymer component including a first thermoplastic polymer consisting of polybutylene terephthalate, and a second thermoplastic polymer consisting of polycarbonate, polyethylene terephthalate, copolymers thereof, or a combination thereof; (b) from about 1 wt % to about 30 wt % of a component comprising a polyester elastomer, an ethylene/alkyl acrylate/glycidyl methacrylate terpolymer compatibilizer, or a combination thereof; and (c) from about 50 wt % to about 70 wt % of a ceramic fiber component comprising ceramic fibers. The first thermoplastic polymer is present the composition in a ratio of at least 2:1 as compared to the second thermoplastic polymer, the combined weight percent value of all components does not exceed 100 wt %, and all weight percent values are based on the total weight of the composition.

Articles formed from the thermoplastic compositions and methods of forming the articles are also described.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
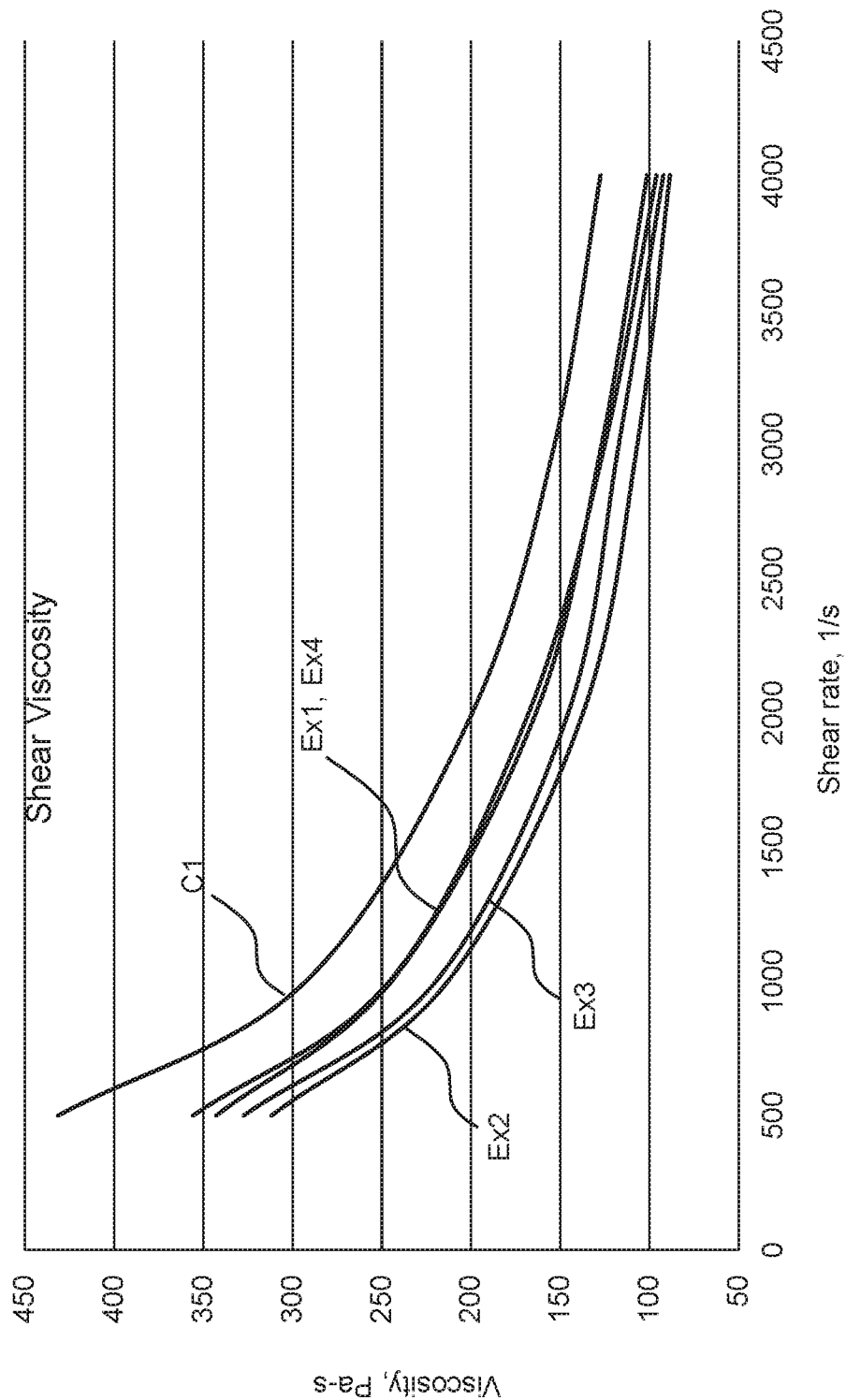
FIG. 1 is a graph showing shear viscosity for several compositions described herein.

The present disclosure can be understood more readily by reference to the following detailed description of the disclosure and the Examples included therein. In various aspects, the present disclosure pertains to thermoplastic compositions including: (a) from about 29 wt % to about 49 wt % of a thermoplastic polymer component including a first thermoplastic polymer consisting of polybutylene terephthalate, and a second thermoplastic polymer consisting of polycarbonate, polyethylene terephthalate, copolymers thereof, or a combination thereof, wherein the first thermoplastic polymer is present the composition in a ratio of at least 2:1 as compared to the second thermoplastic polymer; (b) from about 1 wt % to about 30 wt % of a component comprising a polyester elastomer, an ethylene/alkyl acrylate/glycidyl methacrylate terpolymer compatibilizer, or a combination thereof; and (c) from about 50 wt % to about 70 wt % of a ceramic fiber component including ceramic fibers. The combined weight percent value of all components does not exceed 100 wt %, and all weight percent values are based on the total weight of the composition. Articles formed from the thermoplastic compositions and methods of forming the articles are also described.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting.

Various combinations of elements of this disclosure are encompassed by this disclosure, e.g., combinations of elements from dependent claims that depend upon the same independent claim.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

All publications mentioned herein are incorporated herein by reference to disclose and describe the methods and/or materials in connection with which the publications are cited.

High filler loading causes poor flow properties, which in turn can reduce the melt processability of the composition. The low melt flow specifically reduces the thin wall molding ability. There is a need in the art for polymer composites that provide thin wall moldability and have good flow, mold release performance, ductility, and Izod impact strength properties. Disclosed in various aspects herein are thin walled, moldable, thermoplastic compositions having improved flow, ductility, and impact strength.

In various aspects, the disclosure relates to articles comprising compositions disclosed herein. For example, the disclosed composition relates to thin walled articles comprising the disclosed composition. In this regard, a thin wall is a section of a product that is more narrow when compared to its length and width. As disclosed herein, a thin wall can have a nominal thickness of less than about 3 mm, or in certain aspects less than about 2 mm or less than about 1 mm. The thin walled article can be processed for use in an array of fields, for example, as a housing for a consumer electronic device.

In a further aspect, the present disclosure pertains to methods of preparing thin walled, moldable thermoplastic compositions.

Thermoplastic Compositions

Aspects of the disclosure relate to a thermoplastic composition including:
  a. from about 29 wt % to about 49 wt % of a thermoplastic polymer component including
    i. a first thermoplastic polymer consisting of polybutylene terephthalate, and
    ii. a second thermoplastic polymer consisting of polycarbonate, polyethylene terephthalate, copolymers thereof, or a combination thereof,
    wherein the first thermoplastic polymer is present the composition in a ratio of at least 2:1 as compared to the second thermoplastic polymer;
  b. from about 1 wt % to about 30 wt % of a component comprising a polyester elastomer, an ethylene/alkyl acrylate/glycidyl methacrylate terpolymer compatibilizer, or a combination thereof; and
  c. from about 50 wt % to about 70 wt % of a ceramic fiber component including ceramic fibers. The combined weight percent value of all components does not exceed 100 wt %, and all weight percent values are based on the total weight of the composition.

The thermoplastic polymer component includes a first thermoplastic polymer including polybutylene terephthalate (PBT), and a second thermoplastic polymer including polycarbonate, polyethylene terephthalate, copolymers thereof, or a combination thereof.

As used herein, polybutylene terephthalate can be used interchangeably with poly(1,4-butylene terephthalate). PBT is a type of polyester. The polybutylene terephthalate may include a chemically-upcycled PBT, such as the VALOX™ resins available from SABIC.

In certain aspects the PBT is an up-cycled polymer derived from SABIC's iQ process. In such a process, polyethylene terephthalate (PET) is depolymerized to monomers such as the terephthalate-containing monomer bis(2-hydroxyethyl) terephthalate (BHET) and ethylene glycol (EG). Subsequently, the BHET is polymerized with butane diol (BDO) to form the PBT. In a particular aspect, PET is combined with ethylene glycol (EG) in a depolymerization reactor operating at, e.g., 230 degrees Celsius (° C.) and a pressure of 3.5 bar. The resulting oligomer product includes BHET, EG and PET monomers. This product is combined with BDO in a transesterification reactor operating at, e.g., 230-245° C. and under a 500 millibar (mbar) vacuum to form a trans-esterified PBT oligomer product; EG is distilled out during transesterification. The trans-esterified PBT oligomer product is then polymerized in a polymerization reactor operating at, e.g., <1 mbar to form the PBT.

As used herein, polycarbonate refers to an oligomer or polymer including residues of one or more dihydroxy compounds, e.g., dihydroxy aromatic compounds, joined by carbonate linkages; it also encompasses homopolycarbonates, copolycarbonates, and (co)polyester carbonates. In certain aspects, the polycarbonate can include any polycarbonate material or mixture of materials, for example, as recited in U.S. Pat. No. 7,786,246, which is hereby incorporated in its entirety for the specific purpose of disclosing various polycarbonate compositions and methods. In some aspects the polycarbonate is a homopolymer including repeating units derived from bisphenol A. The polycarbonate may include polycarbonate monomers such as, but not limited to, 2-phenyl-3,3'-bis (4-hydroxy phenyl) phthalimidine (PPPBP) and dimethyl bisphenol cyclohexane (DMBPC).

In particular aspects the second thermoplastic polymer includes a polycarbonate copolymer including repeating units derived from bisphenol A, sebacic acid, polysiloxane, isophthalate terephthalate resorcinol (ITR), phosphate or a combination thereof. Exemplary polycarbonate copolymers include, but are not limited to, polycarbonate-siloxane copolymers (such as EXL resin available from SABIC), isophthaloyl and terephthaloyl resorcinol (ITR) polyester-carbonate (such as SLX resin available from SABIC), high flow high heat polycarbonate copolymer (such as XHT resin available from SABIC), high flow ductile polycarbonate copolymers (such as LEXAN™ HFD available from SABIC), oligomeric phosphonate (such as FRX resin available from FRX Polymers, Inc.). The polycarbonate may be end-capped and may include, but is not limited to, the following endcapping agents: 1,1',1",-tris (4'-hydroxyphenyl) ethane (THPE) and p-hydroxybenzonitrile (HBN). In particular, HBN-endcapped polycarbonate (such as CFR polycarbonate resin available from SABIC) could contribute to flame retardancy (FR) performance of the thermoplastic compositions. The polycarbonate and/or the polycarbonate copolymer may include or be derived from a post-consumer recycle polycarbonate.

In certain aspects the second thermoplastic polymer includes a polycarbonate-siloxane copolymer. The polycarbonate-siloxane copolymer in some aspects has a siloxane content of from about 5 wt % to about 45 wt % based on the total weight of the polycarbonate-polysiloxane copolymer. In further aspects the polycarbonate-siloxane copolymer has a siloxane content of from about 20 wt % to about 45 wt % based on the total weight of the polycarbonate-polysiloxane copolymer. In specific aspects the polycarbonate-siloxane copolymer has a siloxane content of about 40 wt % based on the total weight of the polycarbonate-polysiloxane copolymer.

As used herein, polyethylene terephthalate (PET) can be used interchangeably with poly(ethyl benzene-1,4-dicarboxylate). As with polybutylene terephthalate, polyethylene terephthalate is a type of polyester.

In some aspects the first thermoplastic polymer is present the composition in a ratio of at least 2:1 as compared to the second thermoplastic polymer. In further aspects the first thermoplastic polymer is present the composition in a ratio of at least 3:1 as compared to the second thermoplastic polymer. In yet further aspects the first thermoplastic polymer is present the composition in a ratio of at least 4:1 as compared to the second thermoplastic polymer. It has been found that thermoplastic compositions having a ratio of PBT (i.e., first thermoplastic polymer) to polycarbonate (i.e., second thermoplastic polymer) of at least 2:1, or in particular aspects a ratio of 3:1 or 4:1, have good chemical resistance to agents that have been known to degrade thermoplastic polymers. One such agent is Banana Boat® sunscreen.

The thermoplastic composition may include from about 1 wt % to about 30 wt % of a component comprising a polyester elastomer, an ethylene/alkyl acrylate/glycidyl methacrylate terpolymer compatibilizer, or a combination thereof. This component may function as an impact modifier to enhance the mechanical properties (e.g., impact strength) of the composition.

The polyester elastomer component may include, but is not limited to, polybutylene tere/isophthalate-co-polyoxybutylene. In a particular aspect the polyester elastomer component includes Hytrel® 4056, available from DuPont. In a further aspect the polyester elastomer component includes Arnitel® thermoplastic copolyester (TPC), available from DSM.

The ethylene/alkyl acrylate/glycidyl methacrylate terpolymer compatibilizer component may include, but is not limited to, ethylene methyl acrylate glycidyl methacrylate, ethylene ethyl acrylate glycidyl methacrylate, and combinations thereof. In a particular aspect the ethylene/alkyl acrylate/glycidyl methacrylate terpolymer compatibilizer component is a PC/terpolymer blend, such as Lotader® AX8900, available from Arkema. In certain aspects in which the thermoplastic polymer component includes polyethylene terephthalate and not polycarbonate, it may be possible to omit the ethylene/alkyl acrylate/glycidyl methacrylate terpolymer compatibilizer component from the thermoplastic composition. In such aspects the ethylene/alkyl acrylate/glycidyl methacrylate terpolymer compatibilizer component may be present in the thermoplastic composition in a range of from 0 wt % to about 10 wt %.

The composition may further include an acrylic impact modifier component. The acrylic impact modifier may include, but is not limited to, an ethylene-ethyl acrylate copolymer. In a particular aspect the acrylic impact modifier component Elvaloy® AC 2615, available from DuPont, which is an ethylene-ethyl acrylate copolymer having an ethyl acrylate content below 20%.

The thermoplastic composition includes from about 50 wt % to about 70 wt % of a ceramic fiber component. The ceramic fiber component can include any suitable type of ceramic fiber. In certain aspects the ceramic fiber includes, but is not limited to, alumina, polycrystalline alumina, alpha-crystalline alumina, aluminum silicate, and combinations thereof.

In a particular aspect the ceramic fiber component includes a chopped ceramic fiber such as Nextel™ 610, a ceramic oxide fiber available from 3M in raw form having a fiber length of 3-6 millimeter (mm). When incorporated into the thermoplastic composition in typical compounding processes (e.g., a twin-screw extrusion compounding process), the final fiber length of this fiber is from about 0.1 mm to about 1 mm in the composition. In certain aspects the ceramic fiber component includes a chopped ceramic fiber such as, but not limited to, Nextel™ 312, Nextel™ 440, Nextel™ 720, or a combination thereof. The ceramic fibers may be nonmagnetic and/or non-electrically conductive in some aspects.

The ceramic fiber may in some aspects have a tensile modulus of at least about 150 gigapascals (GPa). In further aspects the ceramic fiber has a tensile modulus of from about 150 GPa to about 500 GPa, or from about 150 GPa to about 300 GPa.

The ceramic fiber component may be a continuous laminate, a unidirectional tape, or prepeg in certain aspects.

In some aspects the thermoplastic composition includes a crystallization suppressant in an amount of from greater than 0 wt % to about 10 wt %. The crystallization suppressant, when included, may function to reduce the PBT crystallization rate so that the thermoplastic polymer component can retain a molten state for a longer period of time, allowing the mold to fill without solidifying too quickly. It can also produce molded parts having a smoother and glossier surface. This smooth and glossy surface may be desired in certain applications in which a high surface quality promotes good adhesion to a substrate (for example, a metal insert surface). Exemplary crystallization suppressants include, but are not limited to, SLX copolymer or polyetherimide (e.g. ULTEM™ resin, available from SABIC).

The thermoplastic composition may in some aspects include a transesterification quenching agent in an amount of from greater than 0 wt % to about 1 wt %. The transesterification quenching agent may be included as a processing aid and could help prevent a transesterification reaction between polycarbonate and PBT (when PC is included in the thermoplastic polymer component). The transesterification quenching agent may be omitted in some aspects where the thermoplastic polymer component includes PET. In a further aspect, the transesterification quenching agent includes a phosphorus-containing stabilizer. In a yet further aspect, the transesterification quenching agent includes an acidic phosphate salt, e.g. a monozinc phosphate, sodium dihydrogen phosphate, potassium hydrogen phosphate, calcium hydrogen phosphate, sodium acid pyrophosphate and mixtures thereof. In an even further aspect, the transesterification quenching agent includes a phosphite compounds, e.g., a phosphite compound of the general formula P—(OR')$_3$ wherein each R' is the same or different and independently represents hydrogen, alkyl groups, aryl groups or any mixture thereof provided that at least one of the R' groups is hydrogen or alkyl. Illustratively, these include, but are not limited to, diphenylisodecyl phosphite, diisooctyl phosphite, dilauryl phosphite, diphenyl phosphite, phenyl diisodecyl phosphite, ethyl hexyl diphenyl phosphite, stearyl phosphite and mixtures thereof. In a still further aspect, the transesterification quenching agent comprises a Group IB or Group IIB phosphate salt such as zinc phosphate. In a further aspect, the transesterification quenching agent includes a phosphorous oxo-acid such as phosphorous acid, phosphoric acid, polyphosphoric acid, or hypophosphorous acid.

In a further aspect, the phosphorus-containing stabilizer is selected from zinc phosphate, diphenylisodecyl phosphite, monosodium phosphate and sodium acid pyrophosphate and mixtures thereof. In a still further aspect, the phosphorus-containing stabilizer is zinc phosphate.

In a further aspect, the transesterification quenching agent is selected from an acidic phosphate salt, a Group IB phosphate salt, a Group IIB phosphate salt, a phosphorus oxo-acid, and mixtures thereof. In a still further aspect, the transesterification quenching agent is an acidic phosphate salt. In a yet further aspect, the transesterification quenching agent is selected from a Group IB phosphate salt and a Group IIB phosphate salt. In an even further aspect, the transesterification quenching agent is mono zinc phosphate. In a still further aspect, the transesterification quenching agent is a phosphorus oxo-acid. The transesterification quenching agent can be sodium stearate. In particular aspects the transesterification quenching agent may include, but is not limited to, an acidic phosphate salt, a Group IB phosphate salt, a Group IIB phosphate salt, a phosphorus oxo-acid, and combinations thereof.

In addition to the foregoing components, the disclosed thermoplastic compositions can optionally include a balance amount of one or more additive materials ordinarily incorporated in thermoplastic compositions of this type, with the proviso that the additives are selected so as to not significantly adversely affect the desired properties of the thermoplastic composition. Combinations of additives can be used. Such additives can be mixed at a suitable time during the mixing of the components for forming the composition. Exemplary and non-limiting examples of additive materials that can be present in the disclosed thermoplastic compositions include an antioxidant, a colorant, a de-molding agent, a dye, a flow promoter, a flow modifier, a light stabilizer, a lubricant, a mold release agent, a pigment, a quenching agent, a thermal stabilizer, a UV absorbant, a UV reflectant, a UV stabilizer, an epoxy chain extender, and combinations thereof.

In particular aspects, an epoxy chain extender additive may be included in the thermoplastic composition to counteract the basicity of the ceramic fiber and/or to help improve/increase long-term mechanical strength retention of the composition. Exemplary epoxy chain extender additives may include, but are not limited to, diglycidil ether and one or more of the JONCRYL® products available from BASF Corp.

In some aspects a molded sample of the thermoplastic composition has a tensile modulus of at least about 25 gigapascals (GPa) as determined in accordance with ASTM D638, or a tensile modulus of at least about 27 gigapascals (GPa) as determined in accordance with ASTM D638. In further aspects a molded sample of the thermoplastic composition has a tensile modulus of from about 15 GPa to about 200 GPa, or from about 20 GPa to about 150 GPa, or from about 25 GPa to about 100 GPa.

In certain aspects a molded sample of the thermoplastic composition has a tensile elongation at break of at least about 1.5% as determined in accordance with ASTM D638. In further aspects a molded sample of the thermoplastic composition has a tensile elongation at break of from about 1% to about 10%, or from about 1.5% to about 5%.

In particular aspects a molded sample of the thermoplastic composition has a notched Izod impact strength of at least about 100 Joules per meter (J/m) as determined in accordance with ASTM D256. In further aspects a molded sample of the thermoplastic composition has a notched Izod impact strength of at least about 280 J/m as determined in accordance with ASTM D256. A molded sample of the thermoplastic composition may in some aspects have a notched Izod impact strength of from about 100 J/m to about 1000 J/m, or from about 200 J/m to about 750 J/m, or from about 200 J/m to about 500 J/m, or from about 250 J/m to about 1000 J/m, or from about 280 J/m to about 500 J/m.

In some aspects a molded sample of the thermoplastic composition has a shear viscosity at 150 cp of less than about 2500 $s^{-1}$ as determined in accordance with ASTM D3835. In further aspects a molded sample of the thermoplastic composition has a shear viscosity at 150 cp of less than about 2000 $s^{-1}$, or a shear viscosity at 150 cp of less than about 1500 $s^{-1}$.

Thermoplastic compositions according to aspects of the disclosure may be chemically resistant, i.e., the mechanical properties (including tensile modulus, tensile strength and/or stiffness) and/or the visual appearance of the thermoplastic composition are not negatively affected when exposed to common chemicals that these thermoplastic compositions encounter. For example, thermoplastic compositions according to the present disclosure may be used in consumer electronics applications (e.g., a wireless communication device) and may be exposed to chemicals such as, but not limited to: adhesives used to adhere the composition (or an article including it) to other parts of the electronics apparatus; sunscreen; and insect repellant. The thermoplastic composition—and articles including them—could thus be subject to chemical attack on external surfaces (e.g., sunscreen and insect repellant) and internal surfaces (e.g., adhesives). Thus, in certain aspects the thermoplastic compositions are chemically resistant to adhesives, sunscreen, insect repellant or a combination thereof. In one particular aspect, the thermoplastic composition is chemically resistant to a heat-cured urethane adhesive. In another particular aspect, the thermoplastic composition is chemically resistant to a moisture-cured urethane adhesive.

In further aspects thermoplastic compositions according to aspects of the disclosure are chemically resistant to a change in mechanical properties when exposed to adhesives, sunscreen and/or insect repellant; i.e., a molded sample of the thermoplastic composition retains at least 80% of its tensile properties—including tensile modulus, tensile strength, and/or stiffness—after exposure to adhesives, sunscreen and/or insect repellant.

Articles of Manufacture

The thin-wall structure can be an injection molded compound or a hybrid molded structure made with (1) a continuous fiber fabric laminate or a UD tape structure, and (2) an injection molded short fiber Compound/composite. The demonstrated characteristics of the disclosed formulations make them well-suited for use in articles of manufacture in the medical, electric and electronic markets, especially those requiring thin-walled components.

In certain aspects, the present disclosure pertains to shaped, formed, or molded articles including the thermoplastic compositions. The thermoplastic compositions can be molded into useful shaped articles by a variety of means as described below. In particular aspects the article includes a thin wall including the thermoplastic composition having a nominal thickness of less than about 2 mm.

Articles formed from thermoplastic compositions according to the present disclosure may include, but are not limited to: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment (including routers, switches, hubs, modems and servers); a structural component of an electronic device; a portable computing device; a hand-held electronic device; an automotive device; a medical device; a sensor device; a security device; a shielding device; an RF antenna device; an LED device; and an RFID device.

Methods for Making Articles Including the Thermoplastic Compositions

Articles including the thermoplastic compositions according to aspects described herein may be formed according to any conventional method. In some aspects the article is extrusion-molded, injection-molded, compression-molded, thermoformed, overmolded, or insert-molded with a metallic or composite laminate insert.

If extrusion-molded, the one or any foregoing components described herein may first be dry blended together, then fed into an extruder from one or multi-feeders, or separately fed into an extruder from one or multi-feeders. The one or any foregoing components may be first dry blended with each other, or dry blended with any combination of foregoing components, then fed into an extruder from one or multi-feeders, or separately fed into an extruder from one or multi-feeders. The components may be fed into the extruder from a throat hopper or any side feeders.

The extruders used in the invention may have a single screw, multiple screws, intermeshing co-rotating or counter rotating screws, non-intermeshing co-rotating or counter rotating screws, reciprocating screws, conical screws, screws with pins, screws with screens, barrels with pins, rolls, rams, helical rotors, co-kneaders, disc-pack processors, various other types of extrusion equipment, or combinations comprising at least one of the foregoing.

The barrel temperature on the extruder during compounding can be set at the temperature where at least a portion of the thermoplastic polymer(s) in the thermoplastic composition have reached a temperature greater than or equal to about the melting temperature, if the thermoplastic polymer(s) is a semi-crystalline organic polymer, or the flow point (e.g., the glass transition temperature) if the thermoplastic polymer(s) is an amorphous polymer.

The mixture including the foregoing mentioned components may be subject to multiple blending and forming steps if desirable. For example, the thermoplastic composition may first be extruded and formed into pellets. The pellets may then be fed into a molding machine where it may be formed into any desirable shape or product. Alternatively, the thermoplastic composition emanating from a single melt blender may be formed into sheets or strands and subjected to post-extrusion processes such as annealing, uniaxial or biaxial orientation.

In particular aspects in which the article is extrusion-molded, a method for making a thermoplastic composition includes: combining the components of the thermoplastic composition to form a mixture; adding the mixture at a feed throat of an extruder and compounding the mixture in the extruder; and extruding the mixture into a mold to form the article. In other aspects one or more of the components of the thermoplastic composition (e.g., the ceramic fiber component) may be added downstream in the extruder according to conventional methods.

Various combinations of elements of this disclosure are encompassed by this disclosure, e.g., combinations of elements from dependent claims that depend upon the same independent claim.

Aspects of the Disclosure

In various aspects, the present disclosure pertains to and includes at least the following aspects.

Aspect 1. A thermoplastic composition comprising, consisting of, or consisting essentially of:
 a. from about 29 wt % to about 49 wt % of a thermoplastic polymer component comprising
  i. a first thermoplastic polymer consisting of polybutylene terephthalate, and
  ii. a second thermoplastic polymer consisting of polycarbonate, polyethylene terephthalate, copolymers thereof, or a combination thereof,
  wherein the first thermoplastic polymer is present the composition in a ratio of at least 2:1 as compared to the second thermoplastic polymer;
 b. from about 1 wt % to about 30 wt % of a component comprising a polyester elastomer, an ethylene/alkyl acrylate/glycidyl methacrylate terpolymer compatibilizer, or a combination thereof; and
 c. from about 50 wt % to about 70 wt % of a ceramic fiber component comprising ceramic fibers,
wherein the combined weight percent value of all components does not exceed 100 wt %, and all weight percent values are based on the total weight of the composition.

Aspect 2. The composition according to Aspect 1, wherein the second thermoplastic polymer comprises polycarbonate and a polycarbonate copolymer, wherein the polycarbonate is a homopolymer comprising repeating units derived from bisphenol A, and wherein the polycarbonate copolymer comprises repeating units derived from bisphenol A, sebacic acid, polysiloxane, isophthalate terephthalate resorcinol (ITR), phosphate or a combination thereof.

Aspect 3. The composition according to Aspect 2, wherein the polycarbonate copolymer comprises a polycarbonate-polysiloxane copolymer having a siloxane content of from about 5 wt % to about 45 wt % based on the total weight of the polycarbonate-polysiloxane copolymer.

Aspect 4. The composition according to any of Aspects 1-3, wherein the polycarbonate is a polycarbonate copolymer including repeating units derived from bisphenol A, sebacic acid, polysiloxane, isophthalate terephthalate resorcinol (ITR), phosphate, or a combination thereof.

Aspect 5. The composition according to any of Aspects 1-4, wherein the ceramic fibers have a tensile modulus of at least 150 GPa.

Aspect 6. The composition according to any of Aspects 1-5, wherein the ceramic fibers have a tensile modulus of at least 300 GPa.

Aspect 7. The composition according to any of Aspects 1-6, wherein the ceramic fibers comprise chopped ceramic fibers having a length of from about 0.1 millimeter (mm) to about 1 mm in the composition.

Aspect 8. The composition according to any of Aspects 1-7, wherein the composition has a tensile modulus of at least 27 GPa as determined in accordance with ASTM D638 or a notched Izod impact strength greater than 280 J/m at 23° C. as determined in accordance with ASTM D256.

Aspect 9. The composition according to any of Aspects 1-8, wherein the ceramic fiber component is a continuous laminate, a unidirectional tape, or prepeg.

Aspect 10. The composition according to any of Aspects 1-9, wherein the ceramic fibers comprise alumina.

Aspect 11. The composition according to any of Aspects 1-9, wherein the ceramic fibers comprise an alpha-crystalline alumina.

Aspect 12. The composition according to any of Aspects 1-11, further comprising a crystallization suppressant in an amount of from greater than 0 wt % to about 10 wt %.

Aspect 13. The composition according to any of Aspects 1-12, further comprising a transesterification quenching agent in an amount of from greater than 0 wt % to about 1 wt %.

Aspect 14. The composition according to any of Aspects 1-13, further comprising an additive material, the additive material selected from the group consisting of: an antioxidant; a colorant; a de-molding agent; a dye; a flow promoter; a flow modifier; a light stabilizer; a lubricant; a mold release agent; a pigment; a quenching agent; a thermal stabilizer; an ultraviolet (UV) absorbant; a UV reflectant; a UV stabilizer; an epoxy chain extender; a flame retardant; and a combination thereof.

Aspect 15. The composition according to any of Aspects 1-14, wherein a molded sample of the thermoplastic composition has a tensile modulus of at least about 25 gigapascals (GPa) as determined in accordance with ASTM D638.

Aspect 16. The composition according to any of Aspects 1-15, wherein a molded sample of the thermoplastic composition has a flexural modulus of at least about 15 GPa as determined in accordance with ASTM D638.

Aspect 17. The composition according to any of Aspects 1-16, wherein the thermoplastic composition is chemically resistant.

Aspect 18. The composition according to any of Aspects 1-17, wherein the ceramic fibers are nonmagnetic or non-electrically conductive.

Aspect 19. The composition according to any of Aspects 1-18, wherein the composition has a flexural modulus as determined in accordance with ASTM D638 that is at least about 50% higher than that of a comparative composition that includes glass fibers instead of the ceramic fiber component comprising ceramic fibers.

Aspect 20. The composition according to any of Aspects 1-19, wherein the composition has a tensile modulus as determined in accordance with ASTM D638 that is at least about 50% higher than that of a comparative composition that includes glass fibers instead of the ceramic fiber component comprising ceramic fibers.

Aspect 21. The composition according to any of Aspects 1-20, wherein the composition has a melt volume rate (MVR) as tested according to ASTM D1238 at 285° C. and 5 kilograms that is at least about 50% higher than that of a comparative composition that includes glass fibers instead of the ceramic fiber component comprising ceramic fibers.

Aspect 22. An article comprising a composition according to any of Aspects 1-21, wherein the article comprises a thin wall having a nominal thickness of less than about 2 mm.

Aspect 23. The article according to Aspect 22, wherein the article has a shear viscosity at 150 cp of less than about 2500 $s^{-1}$ as determined in accordance with ASTM D3835.

Aspect 24. The article according to Aspect 22 or 23, wherein the article is extrusion-molded, injection-molded, compression-molded, thermoformed, overmolded, or insert-molded with a metallic or composite laminate insert.

Aspect 25. The article according to any of Aspects 22-24, wherein the article is selected from the group consisting of: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; and an RFID device.

Definitions

It is also to be understood that the terminology used herein is for the purpose of describing particular aspects only and is not intended to be limiting. As used in the specification and in the claims, the term "comprising" can include the embodiments "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "a polycarbonate" includes mixtures of two or more polycarbonate polymers.

As used herein, the term "combination" is inclusive of blends, mixtures, alloys, reaction products, and the like.

Ranges can be expressed herein as from one value (first value) to another value (second value). When such a range is expressed, the range includes in some aspects one or both of the first value and the second value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the designated value, approximately the designated value, or about the same as the designated value. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optional additive material" means that the additive material can or cannot be included in the thermoplastic composition and that the description includes thermoplastic compositions that both include and do not include additive materials.

Disclosed are the components to be used to prepare the compositions of the disclosure as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the disclosure. Thus, if there are a variety of additional steps that can be performed it is understood that each of these additional steps can be performed with any specific aspect or combination of aspects of the methods of the disclosure.

References in the specification and concluding claims to parts by weight of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent of a component, unless specifically stated to the contrary, is based on the total weight of the formulation or composition in which the component is included.

The terms "BisA," "BPA," or "bisphenol A," which can be used interchangeably, as used herein refers to a compound having a structure represented by the formula:

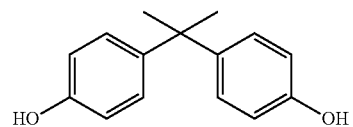 [SMILES: CC(C)(c1ccc(O)cc1)c1ccc(O)cc1]

BisA can also be referred to by the name 4,4'-(propane-2,2-diyl)diphenol; p,p'-isopropylidenebisphenol; or 2,2-bis(4-hydroxyphenyl)propane. BisA has the CAS #80-05-7.

As used herein the terms "weight percent," "%," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Unless otherwise stated to the contrary herein, all test standards are the most recent standard in effect at the time of filing this application.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Table 1 provides a list of components used in one or more of the comparative and example compositions described herein:

TABLE 1

Components

| Component | Source | Description |
|---|---|---|
| VALOX ™ 315 PBT | SABIC | High MW, virgin PBT |
| VALOX ™ 195 PBT | SABIC | Low MW, virgin PBT |
| PBT LOW IV IQ | SABIC | Low MW PBT |
| LEXAN ™ 104 PC | SABIC | Polycarbonate (PC) |
| ML7698 PC copolymer | SABIC | PC-Siloxane copolymer (40% siloxane content in copolymer) |
| C9030P PC copolymer | SABIC | PC-Siloxane copolymer (20% siloxane content in copolymer) |
| SLX PC copolymer 90/10 | SABIC | Polycarbonate copolymer resin, crystallization suppressant |
| HFD1810 PC copolymer | SABIC | High flow ductile PC copolymer |
| Lotader ® AX8900 terpolymer | Arkema | Ethylene/acrylic ester/glycidyl methacrylate terpolymer, impact modifier |
| Hytrel ® 4056 PE elastomer | DuPont | Polyester elastomer, impact modifier |
| Elvaloy AC ® copolymer | DuPont | Ethylene-ethylacrylate copolymer, impact modifier |
| Irganox ® 1010 | BASF | Antioxidant |
| EVERFOS ® 168 | Everspring | Processing stabilizer |
| TINUVIN ® 329 | BASF | Ultraviolet absorber |
| MZP | ICL | Mono zinc phosphate, catalyst quencher |
| GLYCOLUBE PETS | Lonza | Pentaerythritol tetrastearate (PETS), mold release |
| Carbon Black | Cabot | Colorant |
| Nextel ™ 610 fiber | 3M | α-crystalline Al2O3 ceramic fiber |

Comparative and example compositions were prepared and shown in Tables 2A and 2B. Comparative composition C1 is based on a composition previously developed for a 2.0 to 3.0 mm thick enclosure/housing for a consumer electronic device. Example composition Ex1 included only a lower MW PBT rather than the combination of PBTs using in C1. Compositions Ex2-Ex4 included different types of PC copolymers. Compositions Ex5-Ex7 included SLX copolymer. Compositions Ex8 and Ex9 included PBT formed from SABIC's IQ process, and have comparable loading levels to Ex5 and Ex6. Composition Ex10 is an optimized composition based on the observed properties of C1 and Ex1-Ex9.

TABLE 2A

| Component | C1 | Ex1 | Ex2 | Ex3 | Ex4 |
|---|---|---|---|---|---|
| VALOX ™ 315 PBT | 4.377 | | | | |
| VALOX ™ 195 PBT | 16.964 | 21.341 | 21.341 | 21.341 | 21.341 |

TABLE 2A-continued

| Component | C1 | Ex1 | Ex2 | Ex3 | Ex4 |
|---|---|---|---|---|---|
| LEXAN ™ 104 PC | 7.309 | 7.309 | | | |
| ML7698 | | | 7.309 | | |
| C9030P PC-Si Copol 20% | | | | 7.309 | |
| SLX PC 90/10 | | | | | |
| HFD1810 PC | | | | | 7.309 |
| Lotader ® AX8900 | 6 | 6 | 6 | 6 | 6 |
| Hytrel ® 4056 | 2.5 | 2.5 | 2.5 | 2.5 | 2.5 |
| Elvaloy AC ® | 2 | 2 | 2 | 2 | 2 |
| Irganox ® 1010 | 0.1 | 0.1 | 0.1 | 0.1 | 0.1 |
| EVERFOS ® 168 | 0.2 | 0.2 | 0.2 | 0.2 | 0.2 |
| TINUVIN ® 329 | 0.25 | 0.25 | 0.25 | 0.25 | 0.25 |
| MZP | 0.1 | 0.1 | 0.1 | 0.1 | 0.1 |
| GLYCOLUBE PETS | 0.2 | 0.2 | 0.2 | 0.2 | 0.2 |
| Nextel ™ 610 | 60 | 60 | 60 | 60 | 60 |
| Total (wt %): | 100.0 | 100.0 | 100.0 | 100.0 | 100.0 |

TABLE 2B

| Component | Ex5 | Ex6 | Ex7 | Ex8 | Ex9 | Ex10 |
|---|---|---|---|---|---|---|
| VALOX ™ 195 PBT | 44.35 | 35.31 | 24 | | | |
| PBT LOW IV IQ | | | | 44.05 | 35.02 | 19.307 |
| ML7698 | | | | | | 2 |
| SLX PC 90/10 | 14.5 | 11.54 | 7.85 | 14.5 | 11.53 | |
| HFD1810 PC | | | | | | 7.309 |
| Lotader ® AX8900 | 3 | 3 | 3 | 3 | 3 | 5 |
| Hytrel ® 4056 | 2.5 | 2.5 | 2.5 | 2.5 | 2.5 | 2.5 |
| Elvaloy AC ® | 2 | 2 | 2 | 2 | 2 | 2 |
| Irganox ® 1010 | 0.1 | 0.1 | 0.1 | 0.1 | 0.1 | 0.1 |
| EVERFOS ® 168 | | | | 0.2 | 0.2 | 0.2 |
| TINUVIN ® 329 | 0.25 | 0.25 | 0.25 | 0.25 | 0.25 | 0.25 |
| MZP | 0.1 | 0.1 | 0.1 | 0.2 | 0.2 | 0.1 |
| GLYCOLUBE PETS | 0.2 | 0.2 | 0.2 | 0.2 | 0.2 | 0.2 |
| Nextel ™ 610 | 33 | 45 | 60 | 33 | 45 | 60 |
| Carbon Black | | | | | | 1.034 |
| Total (wt %): | 100.0 | 100.0 | 100.0 | 100.0 | 100.0 | 100.0 |

Various properties of the compositions shown above were determined; results are shown in Tables 3A and 3B:

TABLE 3A

| Property | Unit | C1 | Ex1 | Ex2 | Ex3 | Ex4 |
|---|---|---|---|---|---|---|
| Tensile test, ASTM D 638, 5.08 mm/min, 23° C. | | | | | | |
| Modulus of Elasticity-Avg | MPa | 30220 | 29900 | 27340 | 28300 | 29380 |
| Tensile Strength at Yield-Avg | MPa | 111 | 112 | 91.2 | 102 | 110 |
| Tensile Strength at Break-Avg | MPa | 109 | 111 | 88.2 | 93.4 | 108 |
| % Elongation at Break-Avg | % | 2.83 | 2.46 | 3.64 | 3.22 | 2.64 |
| Flexural test - ASTM D790, 3.2 mm, 1.4 mm/min | | | | | | |
| Flexural Modulus-Avg | MPa | 18379 | 191360 | 16073 | 17906 | 19098 |
| Flexural Stress@Yield-Avg | MPa | 173.1 | 176.1 | 143.1 | 162.2 | 177.1 |
| Flexural Stress@Break-Avg | MPa | 172.8 | 176.1 | 142.9 | 161.8 | 177.0 |
| Notched IZOD Impact Strength, ASTM D256, 23° C. | J/m | 293 | 284 | 317 | 312 | 300 |
| Unnotched IZOD Impact Strength, ASTM D256, 23° C. | J/m | 1100 | 911 | 1040 | 1150 | 1040 |
| Melt Volume-flow Rate (MVR), ASTM D1238, 5 kg, 360 s dwell | | | | | | |
| 250° C. | | | | | | |
| 275° C. | | NM | NM | NM | NM | NM |
| 285° C. | | | | | | |
| 300° C. | | 9.1 | 11.2 | 19.9 | 13.0 | 13.4 |

TABLE 3B

| Property | Unit | Ex5 | Ex6 | Ex7 | Ex8 | Ex9 | Ex10 |
|---|---|---|---|---|---|---|---|
| Tensile test, ASTM D 638, 5.08 mm/min, 23° C. | | | | | | | |
| Modulus of Elasticity-Avg | MPa | 17500 | 21960 | 29400 | 16760 | 22040 | 27920 |
| Tensile Strength at Yield-Avg | MPa | 110 | 117 | 113 | 104 | 117 | 110 |
| Tensile Strength at Break-Avg | MPa | 108 | 116 | 112 | 104 | 116 | 109 |
| % Elongation at Break-Avg | % | 1.71 | 1.47 | 1.24 | 1.68 | 1.81 | 2.7 |
| Flexural test - ASTM D790, 3.2 mm, 1.4 mm/min | | | | | | | |
| Flexural Modulus-Avg | MPa | 12609 | 15539 | 20770 | 12593 | 15860 | 19223 |
| Flexural Stress@Yield-Avg | MPa | 167.3 | 174.9 | 169.9 | 163.1 | 176.0 | 167.62 |
| Flexural Stress@Break-Avg | MPa | 167.3 | 175.0 | 169.9 | 163.1 | 176.0 | 167.51 |
| Notched IZOD Impact Strength, ASTM D256, 23° C. | J | 101 | 129 | 164 | 107 | 143 | 252 |
| Unnotched IZOD Impact Strength, ASTM D256, 23° C. | J/m | 633 | 731 | 609 | 685 | 810 | 882 |
| Melt Volume-flow Rate (MVR), ASTM D1238, 5 kg, 360 s dwell | | | | | | | |
| 250° C. | | 27.2 | 15.5 | 4.5 | 39.9 | 24.3 | |
| 275° C. | | 47.8 | 27.8 | 8.1 | 91.8 | 55.6 | |
| 285° C. | | | | | | | 14.2 |
| 300° C. | | | | | | | 30.0 |

Units and abbreviations used in the tables and figures include: millimeter per minute (mm/min); degrees Celsius (° C.); average (Avg); kilogram (kg); seconds (s); megapascal (MPa); joule per meter (J/m); not measurable (NM); pascal-seconds (Pa-s); and inverse seconds (1/s).

Comparative composition C1 and example compositions Ex1-Ex4 had a high tensile modulus (greater than 27 GPa) and very good impact properties (notched Izod impact strength greater than 280 J/m). They did not, however, have good melt properties as observed in the MVR data and the shear viscosity curves in FIG. 1. As a result, it was difficult to mold thin plaques from these compositions, and in fact when it was attempted to mold a 0.6 mm thick plaque from composition C1, the highest possible pressure and injection speed had to be used, resulting in damage to both the nozzle and the bushing of the injection molding machine/equipment/system.

Example compositions Ex5-Ex9 had a comparatively higher melt flow (MVR), although it decreased sharply as fiber loading was increased (compare MVR of Ex5 to Ex6 and then Ex7). These compositions included the SLX PC copolymer resin, which functions as a crystallization suppressant to slows down recrystallization of the PBT resin. As a result, injection molded parts formed from these compositions exhibited a smooth and shiny surface. These compositions, however, do not have good impact and elongation properties. In particular, Ex7 having a ceramic fiber content of 60 wt % had a notched Izod impact strength less than 180 J/m and an elongation of less than 1.3%.

Example composition Ex8 and Ex9, including PBT resin formed from SABIC's iQ process, generally had good mechanical properties (mechanical, impact), surface quality and excellent melt flow (MVR) as compared to using virgin PBT resin having a similar MW (see Ex5 and Ex6). Without being bound by theory, it is thought that since the PBT formed from this process is from chemically recycled sources, the polymer molecular chain structure and end groups could be slightly different and as a result favor improved melt flow and slower crystallization. In view of the results, the Ex8 and Ex9 compositions may be particularly suited for injection molding thin-wall structures.

Figure 2:
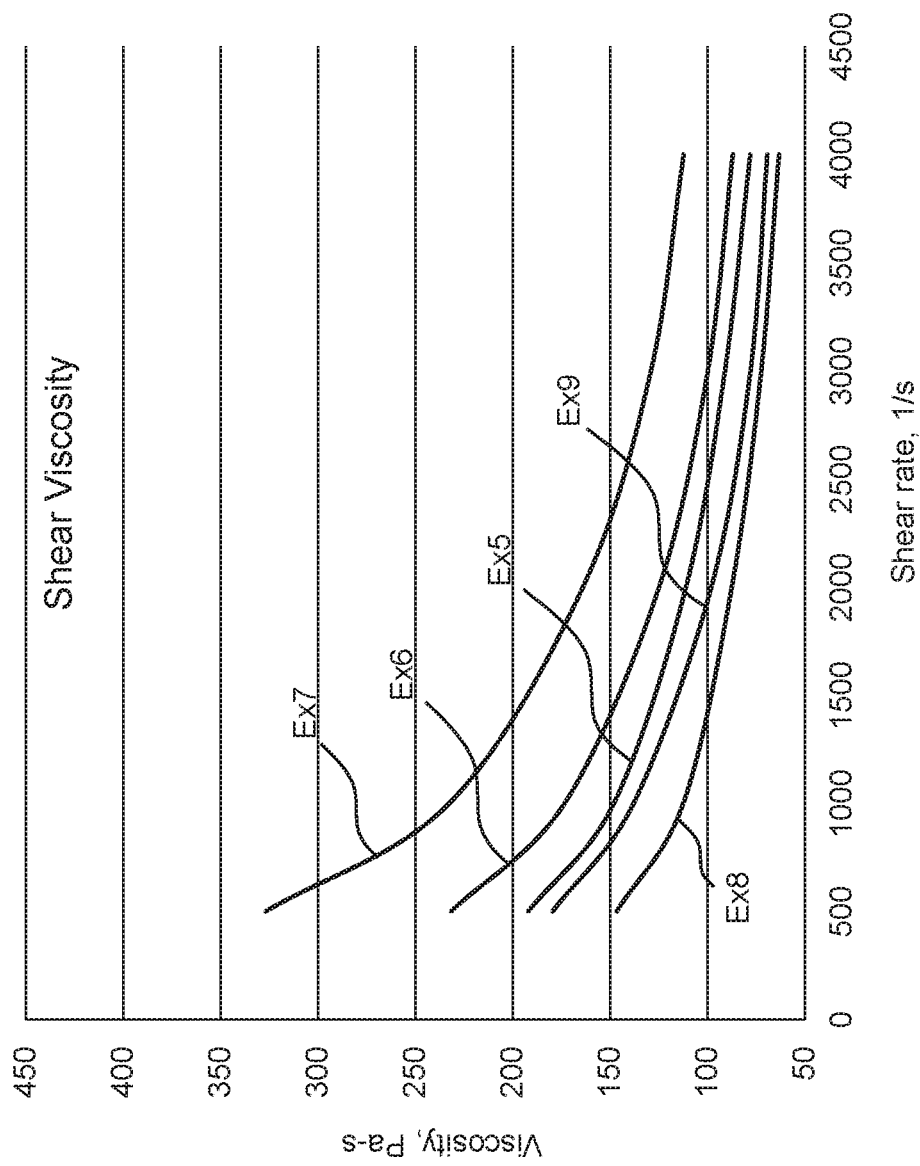
FIG. 2 is another graph showing shear viscosity for several compositions described herein.
Figure 3:
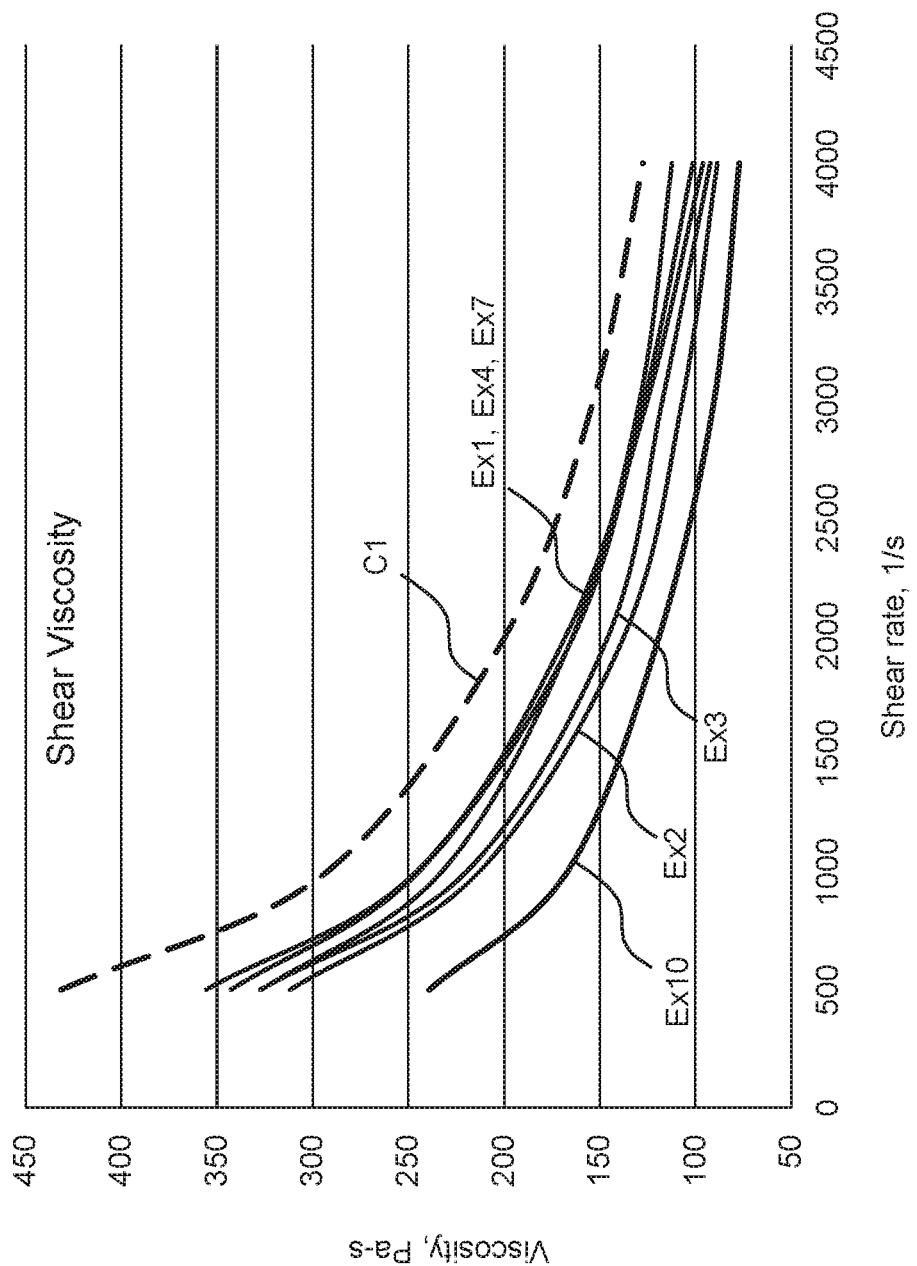
FIG. 3 is an additional graph showing shear viscosity for several compositions described herein.

Rheology analysis: for fiber reinforced composites, in particular those having a high fiber loading, capillary shear viscosity is more accurate and meaningful for guiding the molding process the melt flow volume rate (MVR). Shear viscosity for the compositions is illustrated in FIGS. 1-3. Shear viscosity was determined according to ASTM D3835 at 285° C. (C1, Ex1-Ex4), 275° C. (Ex5-Ex9) and 285° C. (Ex10). Polymer or polymeric composite melts exhibit shear thinning behavior; that is, the higher shear rate, the lower viscosity. For molding a thin-wall structure, it is common to increase the injection molding speed to increase the shear rate in order to lower the melt viscosity for mold filling. However, a very high injection speed can be achieved by applying a very high injection molding pressure, which is challenging for an injection molding equipment. In addition, unwanted residual stress may exist in the molded parts, causing premature failure (e.g. cracking), warpage and dimensional instability and poor surface quality (e.g., residual flow marks on the part surface).

For thinner wall structures, lower viscosity at a lower shear rate may be particularly desirable. It is found that the shear viscosity at 150 cp should in some aspects be less than about 4,000 $s^{-1}$ when molding for a thin-wall structure at the thickness of 0.6 mm.

With reference to FIG. 1, when injection molding a thin plaque at the dimension of 0.6 mm×60 mm×60 mm, composition C1—which had a shear viscosity of at 127 cp of about 4000 $s^{-1}$ or about 3200 $s^{-1}$ at 150 cp—was very difficult to fill into the mold, and as noted above the injection molding equipment was damaged. In contrast, the compositions including all lower molecular weight PBT (Ex1) or modified by HFD resin (Ex4) had a much lower viscosity (about 2300 $s^{-1}$ at 150 cp). When the PC-siloxane copolymers were used (Ex2 and Ex3), the viscosity dropped significantly further (less than about 2000 $s^{-1}$ at 150 cp), making thin-wall molding feasible.

FIG. 2 shows the compositions including ceramic fiber at a range of fiber loading levels, and including a crystallization suppressant. As shown, the melt viscosity of these compositions was reduced (less than 2400 $s^{-1}$ at 150 cp). Comparing Ex5, Ex6 and Ex7, melt viscosity increases dramatically when fiber loading level increases from 33 wt % to 45 wt % and then 60 wt %. This indicates that when fiber loading is high, melt flow decreases. Comparing the viscosity of composition Ex5 to Ex8 at 33 wt % fiber loading, compositions Ex6 and Ex9 at 45 wt % fiber loading, and Ex7 to Ex10 at 60 wt % fiber loading, the compositions including the iQ-PBT (Ex8, Ex9 and Ex10) had a significantly lower viscosity than their comparative compositions (Ex5, Ex6 and Ex7) that included virgin PBT resin. These observations were consistent with the MVR data for these compositions.

Further, as shown in FIG. 3, Ex10—the high-stiff fiber composite—had a much lower viscosity compared to the other compositions including 60 wt % ceramic fiber (C1, Ex1-Ex4, and Ex7). In addition, the lower viscosity of Ex10 (150 cp at 1250 $s^{-1}$), is achieved by formulation optimization and utilizing SABIC proprietary PC copolymer technology. The Ex10 composition also exhibited excellent impact properties (252 Jim notched Izod impact strength and 2.7% elongation at break).

Additional example and comparative compositions were made and tested to evaluate the differences between including ceramic fiber in compositions according to aspects of the disclosure (Ex11 and Ex12) as compared to compositions including conventional glass fiber (C11 and C12). The compositions are shown in Table 4A:

TABLE 4A

|  |  | Ex11 | C11 | Ex12 | C12 |
| --- | --- | --- | --- | --- | --- |
| VALOX ™ 315 PBT | % | 5.377 | 5.377 | 7.076 | 7.076 |
| VALOX ™ 195 PBT | % | 17.69 | 17.69 | 24.311 | 24.311 |
| Lotader ® AX8900 | % | 3 | 3 | 3 | 3 |
| Hytrel ® 4056 | % | 2.5 | 2.5 | 2.5 | 2.5 |
| Glycolube PETS | % | 0.2 | 0.2 | 0.2 | 0.2 |
| Irganox ® 1010 | % | 0.1 | 0.1 | 0.1 | 0.1 |
| EVERFOS ® 168 | % | 0.2 | 0.2 | 0.2 | 0.2 |
| MZP | % | 0.1 | 0.1 | 0.1 | 0.1 |
| TINUVIN ® 329 | % | 0.25 | 0.25 | 0.25 | 0.25 |
| Elvaloy AC ® | % | 2 | 2 | 2 | 2 |
| Lexan ™ 104 (Homopolymer PC) | % | 7.549 | 7.549 | 10.263 | 10.263 |
| Carbon black | % | 1.034 | 1.034 |  |  |
| Nextel ™ 610 | % | 60 |  | 50 |  |
| Johns Manville JM 718 (E-Glass fiber) | % |  | 60 |  |  |
| Nitto Boseki CSG 3PA-830 (flat E-GF) | % |  |  |  | 50 |
| Total (%) |  | 100 | 100 | 100 | 100 |

Lexan™ 104 is a polycarbonate homopolymer from SABIC having a melt volume rate (MVR) of 7 cubic centimeters ($cm^3$)/10 minutes at 300° C. and 1.2 kilograms. The JM 718 E-glass fiber is a round glass fiber having a diameter of about 10 micron and a pre-compounded length of about 4 millimeters (mm). The 3PA-830 glass fiber is a chopped, oval-shaped E-glass fiber with a modification ratio of 4 (width of 28 micron to thickness of 7 micron) and an average chopped fiber length of 3 mm. The compositions of Table 4A were tested and are shown in Table 4B:

TABLE 4B

|  |  | Ex11 | C11 | Ex12 | C12 |
|---|---|---|---|---|---|
| Specific Gravity |  | 2.009 | 1.775 | 1.832 | 1.6645 |
| Flexural Modulus | GPa | 22.6 | 15.4 | 19.7 | 12.7 |
| Flexural Stress@Yield | MPa | 158 | 188 | 184 | 257 |
| Flexural Stress@Break | MPa | 139 | 160 | 184 | 256 |
| Notched Izod Impact Strength | J/m | 128 | 160 | 154 | 229 |
| Unnotched Izod Impact Strength | J/m | 694 | 727 | 691 | 1100 |
| Tensile Modulus | GPa | 30.24 | 18.92 | 26.38 | 15.98 |
| Tensile Strength at Yield | MPa | 103 | 127 | 120 | 173 |
| Tensile Strength at Break | MPa | 102 | 126 | 120 | 173 |
| % Elongation at Yield | % | 1.3 | 1.85 | 1.47 | 2.08 |
| % Elongation at Break | % | 1.43 | 1.9 | 1.54 | 2.11 |
| MVR (275 C., 5 Kg) | cm³/10 min | 25.1 | * | 26.4 | 15 |
| MVR (285 C., 5 Kg) | cm³/10 min | 38.7 | 2.84 | 45.1 | 25 |

Ex 11 and Ex 12 and their corresponding comparative compositions include two PBT components and polycarbonate homopolymer as the second thermoplastic polymer. The compatibilizer is Lotader® AX8900. From the data in Table 4B it is observed that compositions including ceramic fiber had a substantially higher stiffness (flexural modulus and tensile modulus) and a much higher melt flow (MVR) as compared to the comparative compositions that include glass fiber.

From the collective data it is observed that the compositions according to aspects of the disclosure have improved processability without compromising their mechanical properties.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A thermoplastic composition comprising:
   a. from about 29 wt % to about 49 wt % of a thermoplastic polymer component comprising
      i. a first thermoplastic polymer comprising a chemically upcycled polybutylene terephthalate, and
      ii. a second thermoplastic polymer comprising a polycarbonate copolymer,
      wherein the first thermoplastic polymer is present the composition in a ratio of at least 2:1 as compared to the second thermoplastic polymer;
   b. from about 1 wt % to about 30 wt % of a component comprising a polyester elastomer, an ethylene/alkyl acrylate/glycidyl methacrylate terpolymer compatibilizer, or a combination thereof; and
   c. from about 50 wt % to about 70 wt % of a ceramic fiber component comprising ceramic fibers,
      wherein the combined weight percent value of all components does not exceed 100 wt %, and all weight percent values are based on the total weight of the composition,
      wherein the composition has a melt volume rate (MVR) as tested according to ASTM D1238 at 285° C. and 5 kilograms that is at least 50% higher than that of a comparative composition that includes glass fibers instead of the ceramic fiber component comprising ceramic fibers, and
      wherein a molded sample of the thermoplastic composition has a tensile modulus of at least 20 gigapascals (GPa) as determined in accordance with ASTM D638.

2. The composition according to claim 1, wherein the polycarbonate copolymer comprises repeating units derived from bisphenol A, sebacic acid, polysiloxane, isophthalate terephthalate resorcinol (ITR), phosphate or a combination thereof.

3. The composition according to claim 2, wherein the polycarbonate copolymer comprises a polycarbonate-polysiloxane copolymer having a siloxane content of from about 5 wt % to about 45 wt % based on the total weight of the polycarbonate-polysiloxane copolymer.

4. The composition according to claim 1, wherein the ceramic fibers have a tensile modulus of at least 150 GPa and comprise chopped ceramic fibers having a length of from about 0.1 millimeter (mm) to about 1 mm in the composition.

5. The composition according to claim 1, wherein the composition has a tensile modulus of at least 27 GPa as determined in accordance with ASTM D638 or a notched Izod impact strength greater than 280 J/m at 23° C. as determined in accordance with ASTM D256.

6. The composition according to claim 1, wherein the ceramic fibers comprise an alpha-crystalline alumina.

7. The composition according to claim 1, further comprising a crystallization suppressant in an amount of from greater than 0 wt % to about 10 wt % or a transesterification quenching agent in an amount of from greater than 0 wt % to about 1 wt %.

8. The composition according to claim 1, further comprising an additive material, the additive material selected from the group consisting of: an antioxidant; a colorant; a de-molding agent; a dye; a flow promoter; a flow modifier; a light stabilizer; a lubricant; a mold release agent; a pigment; a quenching agent; a thermal stabilizer; an ultraviolet (UV) absorbant; a UV reflectant; a UV stabilizer; an epoxy chain extender; a flame retardant; and a combination thereof.

9. The composition according to claim 1, wherein a molded sample of the thermoplastic composition has a tensile modulus of at least about 25 gigapascals (GPa) as determined in accordance with ASTM D638 or a molded sample of the thermoplastic composition has a flexural modulus of at least about 15 GPa as determined in accordance with ASTM D638.

10. The composition according to claim 1, wherein the thermoplastic composition is chemically resistant.

11. An article comprising a composition according to claim 1, wherein the article comprises a thin wall having a nominal thickness of less than about 2 mm.

12. The composition according to claim 1, wherein the thermoplastic composition has a shear viscosity at 150 cp of less than about 2500 s-1 as determined in accordance with ASTM D3835.

13. The article according to claim 11, wherein the article is extrusion-molded, injection-molded, compression-molded, thermoformed, overmolded, or insert-molded with a metallic or composite laminate insert.

14. The article according to claim 11, wherein the article is selected from the group consisting of: a communication device; a computer device; an electromagnetic interference device; a printed circuit; a Wi-Fi device; a Bluetooth device; a GPS device; a cellular antenna device; a smart phone device; a wireless communication device; a structured media enclosure; an antenna concealing enclosure; an enclosure for networking equipment; a structural component of an electronic device; a portable computing device; a hand-held electronic device; an automotive device; a medical device; a sensor device; a security device; a shielding device; an RF antenna device; an LED device; and an RFID device.

15. An article comprising a composition according to claim 1, wherein the article comprises a thin wall having a nominal thickness of about 0.6 mm.

\* \* \* \* \*